(12) United States Patent
Weiss et al.

(10) Patent No.: US 11,854,544 B1
(45) Date of Patent: Dec. 26, 2023

(54) ENTITY RESOLUTION OF PRODUCT SEARCH FILTERS

(71) Applicant: Amazon Technologies, Inc., Seattle, WA (US)

(72) Inventors: Gary Weiss, Givatayim (IL); David Shamouilian, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 17/345,734

(22) Filed: Jun. 11, 2021

(51) Int. Cl.
| | |
|---|---|
| *G06F 16/00* | (2019.01) |
| *G06F 16/245* | (2019.01) |
| *G06F 16/2455* | (2019.01) |
| *G06F 16/248* | (2019.01) |
| *G10L 15/08* | (2006.01) |
| *G10L 15/22* | (2006.01) |
| *G10L 15/183* | (2013.01) |
| *G06F 16/242* | (2019.01) |
| *G06N 20/00* | (2019.01) |
| *G06F 16/22* | (2019.01) |

(52) U.S. Cl.
CPC .......... *G10L 15/22* (2013.01); *G06F 16/2246* (2019.01); *G06F 16/2425* (2019.01); *G06N 20/00* (2019.01); *G10L 15/183* (2013.01); *G10L 2015/223* (2013.01)

(58) Field of Classification Search
USPC .................. 704/1–275; 706/1–62, 900–903; 707/705–740, 754–805
See application file for complete search history.

(56) References Cited

U.S. PATENT DOCUMENTS

| | | | |
|---|---|---|---|
| 9,922,344 B1 | 3/2018 | Christophe et al. | |
| 10,726,041 B1* | 7/2020 | Segler, Jr. | ........... G06F 16/9024 |
| 10,853,331 B1* | 12/2020 | Segler, Jr. | ............. G06F 16/282 |
| 10,923,111 B1 | 2/2021 | Fan et al. | |
| 2005/0022129 A1* | 1/2005 | Borenstein | .............. G06F 9/451 |
| | | | 715/734 |
| 2012/0323921 A1* | 12/2012 | Chen | ..................... G06F 16/313 |
| | | | 707/E17.09 |

(Continued)

FOREIGN PATENT DOCUMENTS

| | | | | |
|---|---|---|---|---|
| CN | 102067590 | * | 5/2011 | ............... H04N 5/92 |
| EP | 2045798 A1 | | 4/2009 | |
| WO | 2018217194 A1 | | 11/2018 | |

OTHER PUBLICATIONS

U.S. Appl. No. 17/205,872, "Voice Search Attribute Identification and Refinement," filed Mar. 18, 2021, 40 pages.

(Continued)

*Primary Examiner* — Marcellus J Augustin
(74) *Attorney, Agent, or Firm* — Kilpatrick Townsend & Stockton LLP

(57) ABSTRACT

Voice product search requests in a product catalog are improved by identifying search refinements versus new search requests and by applying filters of departments to identify sub-sets of the product catalog to search based on the search string. The systems and methods described herein provide for analysis of voice search data, identification of departments within a product catalog that may be applicable to the search request and the search refinement, limiting the scope of the search, matching the voice input to an attribute type, and performing the refinement on the search results.

20 Claims, 6 Drawing Sheets

(56) References Cited

U.S. PATENT DOCUMENTS

| | | | |
|---|---|---|---|
| 2016/0188747 A1* | 6/2016 | Cypher | G06F 16/84 |
| | | | 707/756 |
| 2018/0108066 A1 | 4/2018 | Kale et al. | |
| 2019/0180343 A1* | 6/2019 | Arnett | G06Q 30/0633 |
| 2020/0143806 A1 | 5/2020 | Sreedhara | |
| 2021/0065278 A1 | 3/2021 | Ni et al. | |
| 2021/0082412 A1 | 3/2021 | Kennewick | |
| 2021/0319492 A1* | 10/2021 | Jeong | G06F 16/3335 |

OTHER PUBLICATIONS

U.S. Appl. No. 17/249,933, "Voice Search Refinement Resolution," filed Mar. 18, 2021, 38 pages.

U.S. Appl. No. 15/817,938, "Systems and Methods for Determining Long Term Relevance With Query Chains," filed Nov. 20, 2017, 38 pages.

* cited by examiner

ENTITY RESOLUTION OF PRODUCT SEARCH FILTERS

BACKGROUND

Voice interfaces of electronic devices, such as voice-controlled devices, can be used to receive and process instructions from users. For example, a user can instruct a voice-controlled device to perform a query in a database of products. So long as the user correctly and clearly identifies the query information, a backend server associated with the voice-controlled device will likely be able to process the query and produce a listing of matching results.

When the user's instructions with respect to a query are vague or otherwise less definite such as follow-up queries on an initial search including additional attributes, correctly identifying the user goal may prove challenging.

BRIEF DESCRIPTION OF THE DRAWINGS

Various embodiments in accordance with the present disclosure will be described with reference to the drawings, in which.

DETAILED DESCRIPTION

Figure 1:
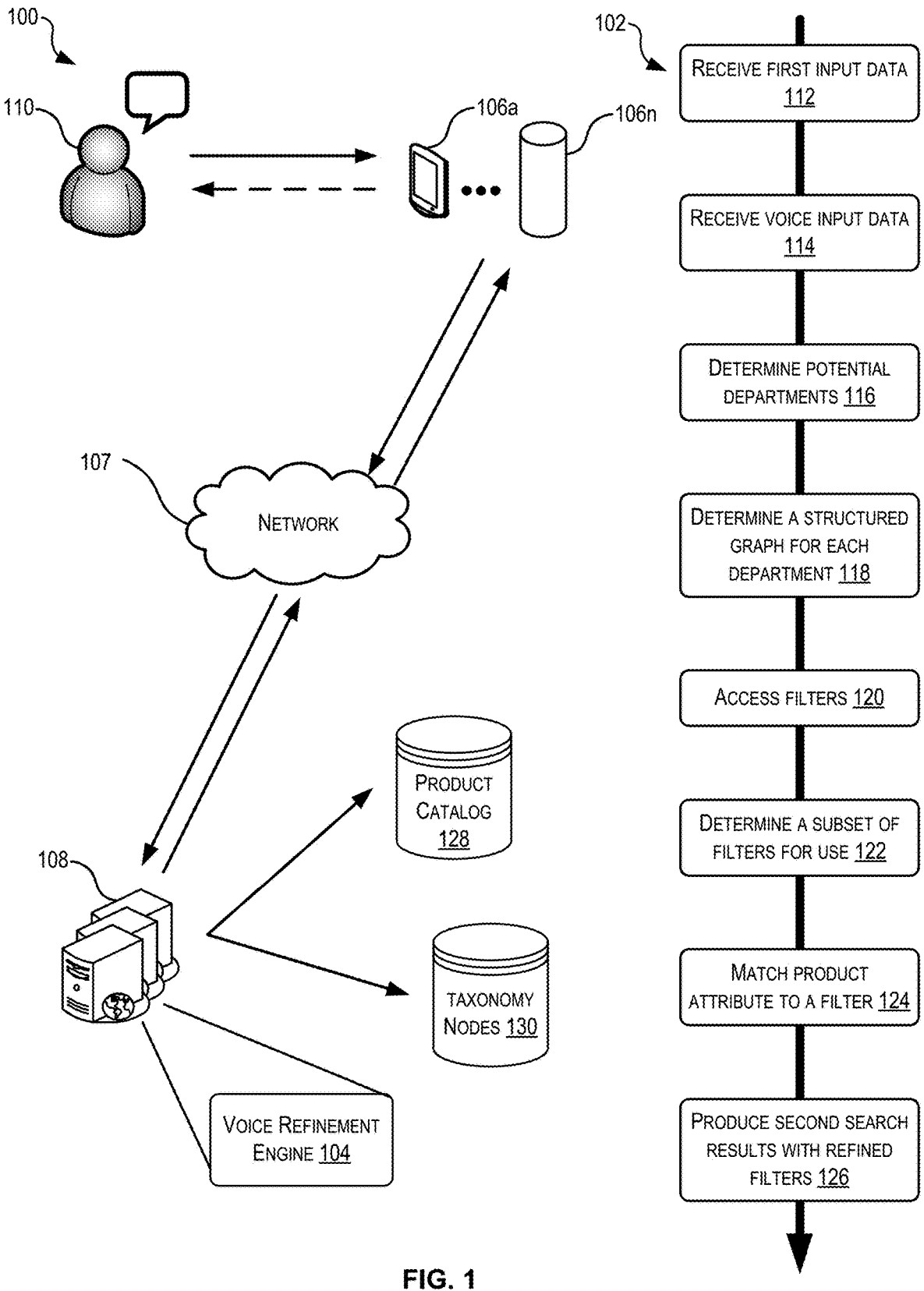
FIG. 1 is an example block diagram and associated flowchart showing a process for implementing techniques relating to searching a product catalog and refining a search using voice inputs, according to at least one example.

Examples described herein are directed to, among other things, techniques for processing voice search requests and refining product catalog searches based on voice input refinements and product catalog taxonomy. In some examples, the techniques described herein may be applicable to any voice requests or voice interactions with a voice-assistant or voice-enabled device. A computing device may be used to determine a department of the product catalog and associated set of filters with the particular department. The set of filters may be used to further refine the search request and verify and/or confirm that the search request from a user is being processed through a proper department of the product catalog. In an example, a user may first search a product catalog for "shoes." The product catalog may include structured graphs that break the department for shoes into sub-departments defined by the structured graph as divided into "men's shoes" and "women's shoes" and may include further sub-divisions of the catalog based on color, style, price, or other attributes of the products included in the department. In the example provided, the user may provide an utterance in a subsequent search turn requesting "blue." Initially, the systems and methods described herein identify and resolve that the voice input is referring to a product attribute related to a color. The system may then identify a node of the structured graph associated with color refinements in response to the voice refinement. The system may further resolve that the request is for a value of "blue" at the color node of the structured graph. By resolving to this node, the system is able to identify a sub-department of the department for applying refinements and to provide clear and accurate search results to the user related to their uttered search refinement. Though examples are provided herein in the context of describing searching items such as consumer goods from an online marketplace, the systems and methods herein may be useful for searching any system, database, or collection of items sorted or sortable through a taxonomy including animal or drug classes among other examples.

The examples described herein present techniques whereby a natural language processing algorithm may have previously identified portions of an input from a user that correspond to known classes or attribute classes of a product (e.g., color, size, department). The examples also present techniques whereby the portions of the user input may correspond to values associated with the known attribute classes or attributes of the product (e.g., red, blue, size 10, children's clothing). The portions of the user input may also be identified as attributes, but for which an attribute class is not known. For example, an attribute for "short sleeve" may be identified, but an attribute class to which the short sleeve attribute belongs may not be identified.

The examples described herein also enable the system to identify when a user is requesting a new search via an uttered request versus providing a refinement of the previous search turn. This process may be performed through several different examples, for instance by identifying repeated utterances indicative of a previous refinement versus new search request resolving an incorrect answer. In some examples, the systems herein may generate confidence values, using a machine learning algorithm, for each option (e.g., refinement versus new search) and may identify based on the confidence scores, for example by selecting the option with a higher confidence score. The system may, in some examples, identify when the voice input includes product attributes of a product searched in a previous search turn. When the product searched for in a previous turn has nodes on the structured graph corresponding to the attribute identified in the voice request, the system may identify that the voice input is for a refinement of the previous search. In some examples, the system may prioritize refinements and only resort to a new search if an attribute cannot be resolved within a current department of the product catalog or if the user repeats the voice input, indicating an incorrect decision on the previous refinement evaluation.

Turning now to a particular example, a user may initially search a product catalog of an electronic marketplace by inputting a search request into a search engine configured to search the product catalog. The initial search request may explicitly identify a product type and one or more product attributes, for example "red shoes" or "shoes." In a subsequent search turn, the user may provide a voice input to filter the search results. The voice input may include commands such as "show me blue ones" that identify a value for an attribute of the product type that may be filterable on a structured graph of the product catalog by resolving a node corresponding to color and selecting a sub-department with an attribute value of "blue." The use may also provide inputs to search for a particular brand, a search department, demographics, or other inputs. The systems and methods described herein provide for entity resolution for these cases, to a specific search catalog, leveraging large-filter-values cases, local-filter cases, and heuristic cases. In this manner, the filter cases according to the structured graph for a particular department may be used to efficiently narrow the search results to those sought by the user and reduce the number of out-of-department search results that may otherwise be included. The systems and methods herein also handle detection of start of new search that may otherwise be misunderstood to be a refinement of a previous search request.

The techniques and methods described herein provide several advantages over conventional voice-control systems and methods. In particular, the techniques described herein enable users to filter product searches in catalogs by voice interactions and thereby improves a user experience while interacting with the electronic catalog. For example, without the techniques described herein, a user may request to "filter by size 10" and a voice-search enabled catalog or voice assistant may not be able to resolve any particular action to perform. In this manner, the techniques and systems described herein provide for improvements over existing voice-searching techniques and enable interactions through voice assistants that would previously not have produced results.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Turning now to the figures, FIG. 1 is an example block diagram and associated flowchart showing a process for implementing techniques relating to searching a product catalog and refining a search using voice inputs, according to at least one example. The diagram 100 depicts devices, objects, and the like that correspond to the process 102. The process 102 can be performed by a user device, a server computer, or some combination of the two. In some examples, a voice shopping engine 104, which may be implemented in a server computer (e.g., a service provider 108), may perform the techniques described herein, e.g., determine whether a voice request includes a refinement of a previous search request and subsequently resolve a structured graph to identify a subset of the product catalog that fits the refined search request. In some examples, at least a portion of the voice shopping engine 104 is implemented by a user device 106 (e.g., a mobile device or a voice-controlled device). The service provider 108 may communicate with the user device 106 via one or more networks 107.

The process 102 may begin at 112 by the user device 106 receiving first input data. The first input data may be typed, voice input, or otherwise provided to user device 106 (e.g., by a user 110 operating the user device 106). The first input data may include information for searching or otherwise interacting with a service, such as a datastore, a web application, or other service provided by the service provider 108. In some examples, the datastore may include a catalog such as the product catalog 128 of an electronic marketplace hosted or otherwise associated with the service provider 108. The product catalog 128 may include listings, descriptions, and information related to various products and products available from the electronic marketplace hosted by the service provider 108. The first input data may, for example, include a first search request to search the product catalog 128 for products of a particular type. The datastore may also include taxonomy nodes 130. The taxonomy nodes 130 may include a structured graph or arrangement of each department within the product catalog broken down according to a plurality of taxonomy nodes associated with filters of the department. For example, the taxonomy nodes 130 may include identifications of nodes that break a department into colors, sizes, shapes, brands, prices, and other such product attributes or filters useful for dividing up the collection of items within the department. The first input data is provided by user 110. For example, the first input data may include the user 110 speaking at the user device 106 via a voice interface of the user device 106. The user device 106 processes the voice command and carries out one or more actions in response to the first input data. The user device 106, in response to the first input data, may send a request to the service provider 108 (e.g., via the network 107) to search a database such as a catalog of an electronic marketplace based on the first input data. The user device 106 may include a variety of example user devices, including computing devices, smartphones, standalone digital assistant devices, wearable device (e.g., headphones, a watch, eyewear, or other suitable wearable device), tablet devices, laptop computers, desktop computers, and other such user devices.

At 114, the process 102 may include receiving, at the user device 106, voice input data associated with a voice request. The voice input data may be received at the user device 106 via a microphone or other voice interface of a device communicably coupled with the user device 106. The voice input data may be processed using a natural language processing algorithm to generate one or more search terms in some examples. The natural language processing algorithm may be embodied in the user device 106 or passed to the service provider 108 by the user device 106 for processing. The natural language processing algorithm may be embodied in the NLP engine 238 of FIG. 2. In some examples, the natural language processing algorithm includes an automatic speech recognition engine that performs speech recognition as part of the language processing. The natural language processing engine produces a string including a transcription of the voice input from the user as well as part of speech tagging that marks different portions of the string as being associated with different parts of speech, different attributes, different values, or other such marking.

At 116, the process 102 may include the service provider 108 determining potential departments for searching based on the first input data. After the first input data is received at 112 and processed by the service provider 108 (e.g., by a natural language processing algorithm (NLP) such as the NLP engine 238 of FIG. 2), the service provider 108 may also cause one or more actions to be performed. In some examples, the action may include searching within a product catalog and identifying the departments in which products fitting the first search query may reside. The product catalog may be searched communicating with one or more systems, such as the product catalog 128 over the network 107.

At 118 the process 102 may include the service provider 108 determining a structured graph for each potential department identified at 114. The structured graph may include one or more potential departments and nodes identifying branches to differentiate between different departments included in the structured graph. In some examples, the structured graph also includes sub-departments that provide further nodes for filtering and breaking each department down into further sub-groups based on filters and attribute types, such as price, brand, color, shape, demographics, and other such filterable refinements. For each node in the structured graph, a collection of known taxonomy nodes may be collected from the taxonomy nodes 130. The taxonomy nodes 130 may identify different values associated with each of the nodes in the structured graph, for example to identify the different color options available (e.g., blue, green, red, yellow, etc.) for a color node of the structured graph. At 120, filter may be accessed corresponding to each of the nodes of the structured graph, the filters including the values described above, such as the different value options available within the product catalog 128 for different colors.

At 122, the process 102 may include the service provider 108 determining a subset of filters for use. The subset of filters for use may be selected based on the available nodes within the structured graph. The subset of filters may enable the service provider to filter search results and select subcategories of the structured graph based on particular filters. The particular filters may correspond to a single node of the structured graph or may be applicable to multiple nodes and be useful for applying known filters (e.g., predefined filters) to reduce the size of the structured graph and thereby produce more accurate search results.

At 124, the process 102 may include the service provider 108 matching a product attribute extracted from the voice input at 116 to one or more filters of the subset of filters from 122. The matching of the product attributes to the filters enables the system to select relevant values from the various nodes of the structured graph and select the relevant sub-departments and categories for applying the search query. The matched set of filters become a refined set of filters to use to initially reduce the portions of the product catalog to be searched with the refinements.

At 126, the process 102 may include the service provider 108 refining the search query based on the refined set of filters. The refinement may include applying the updated search value string with the added terms from the voice input to the refined product department. In some examples, the service provider 108 may additionally determine whether to refine the existing query or to start a new query based on the refined filters. The service provider 108 may apply a rule to prioritize remaining in a current department or sub-department of the product catalog as laid out in the structured graph when the refined set of filters are associated with the current department. In the event that the refined set of filters do not match the current department, the rule may prioritize moving to a sub-department where the refined filters may match. If no match may be found within the current department, the rule may cause the service provider 108 to either suggest switching departments to a new department of the catalog or initiating a new search.

The process 102 may also include the service provider 108 generating second search results. The second search results include listings of products from the product catalog 128 that match the product identified in the input data, voice input data, refined filters, and fit within the structured graphs.

In some examples, the process 102 may also include the service provider 108 determining whether the voice input data is a refinement of the first input data or a start of a new search. In some examples, a machine learning algorithm may determine a refinement score and/or a new search score indicative of a probability that the voice input data is a refinement of the first input data or a start of a new search. In some examples, a reference to the same product or product identifier in the first input data and the second input data may be used to aid in determining that the voice input data is a refinement of the first input data. In some examples, the voice input data may include an explicit instruction to refine or filter the first search results with the second input data.

In some examples, the process 102 may include the user device 106 displaying the second search results after refining the search results. The second search results may be displayed at the user device 106 or any other suitable display for the user 110 to view the results of the second search.

Figure 2:
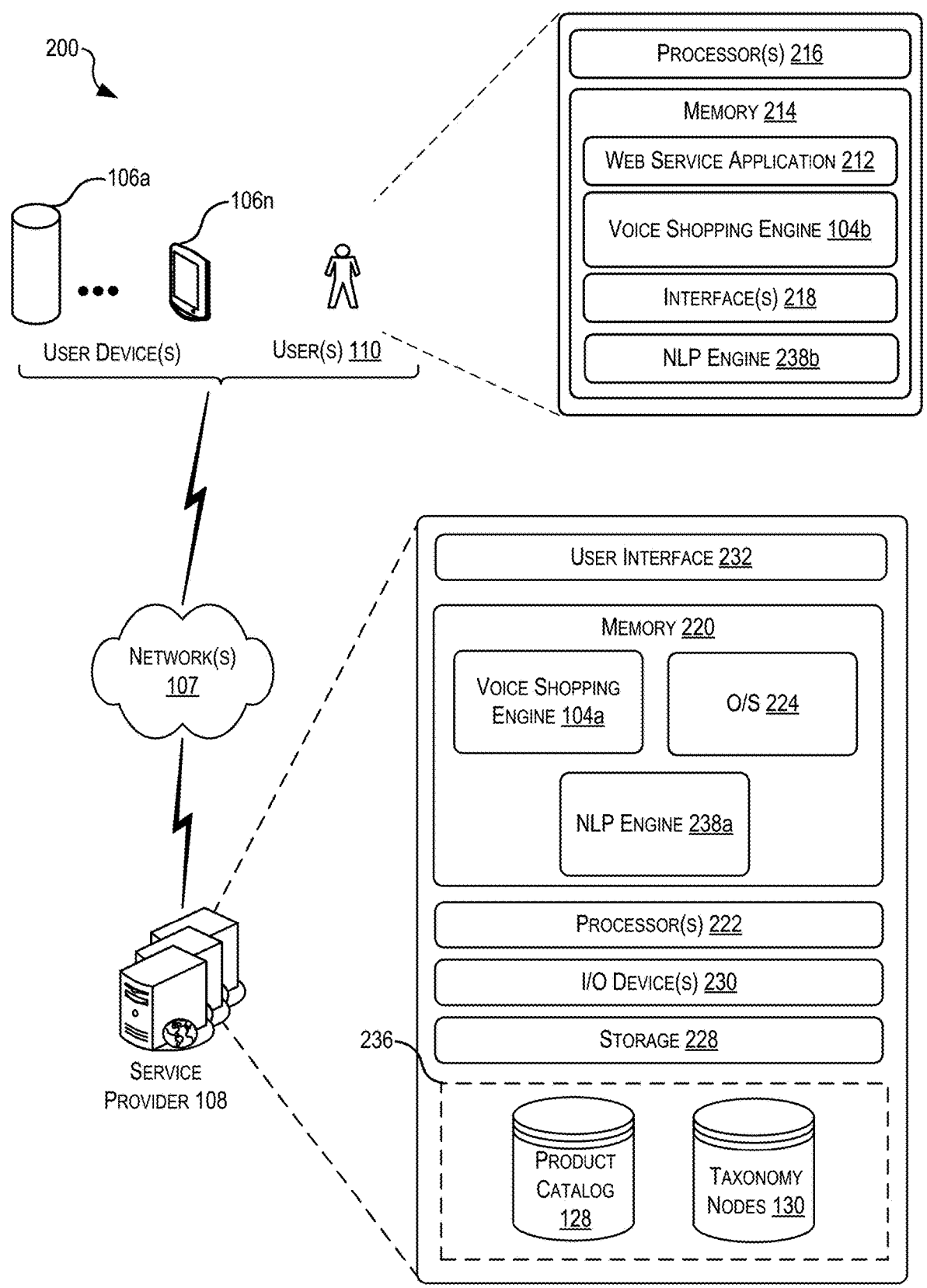
FIG. 2 is an example schematic architecture for implementing techniques relating to searching a product catalog based on filter resolution based on voice inputs, according to at least one example.

FIG. 2 is an example schematic architecture for implementing techniques relating to searching a product catalog based on filter resolution based on voice inputs, according to at least one example. The architecture 200 may include the service provider 108 in communication with one or more user devices 106a-106n via one or more networks 107 (hereinafter, "the network 107").

The user device 106, which may include a mobile device such as a smartphone, a computing device, a voice-controlled device, or other such device, may be operable by one or more users 110 to interact with the service provider 108. The user device 106 may be any suitable type of computing device such as, but not limited to, a wearable device, voice-controlled device (e.g., a smart speaker), a tablet, a mobile phone, a smart phone, a network-enabled streaming device (a high-definition multimedia interface ("HDMI") microconsole pluggable device), a personal digital assistant ("PDA"), a laptop computer, a desktop computer, a thin-client device, a tablet computer, a high-definition television, a web-enabled high-definition television, a set-top box, etc. For example, the user device 106a is illustrated as an example of voice-controlled user device, while the user device 106n is illustrated as an example of a handheld mobile device. In some example, the user device 106a may be connected to a voice-controlled intelligent personal assistant services. The user device 106a may respond to some predefined "wake word" such as "computer." In some examples, the user device 106a is capable of voice interaction, music playback, making to-do lists, setting alarms, streaming podcasts, playing audiobooks, and providing weather, traffic and other real-time information. In some examples, the user device 106a can also control several smart devices acting as a home automation hub. In some examples, electronic content products are streamed from the service provider 108 via the network 120 to the user device 106. The user device 106n may include a voice interface to interacting with and using a voice-assistant similar to user device 106a, described above.

The user device 106 may include a memory 214 and processor(s) 216. In the memory 214 may be stored program instructions that are loadable and executable on the processor(s) 216, as well as data generated during the execution of these programs. Depending on the configuration and type of user device 106, the memory 214 may be volatile (such as random access memory ("RAM")) and/or non-volatile (such as read-only memory (ROM), flash memory, etc.).

In some examples, the memory 214 may include a web service application 212, a voice shopping engine 104b, and a natural language processing engine 238. In some examples, the natural language processing engine 238 may be a component of the voice shopping engine 104b. The web service application 212 and/or the voice shopping engine 104b may allow the user 110 to interact with the service provider 108 via the network 120. Such interactions may include, for example, searching the product catalog, providing filters to filter search results from the product catalog, creating, updating, and managing user preferences associated with the user 110 and/or any one of the user devices 106. The memory 214 also includes one or more user interfaces 218. The interfaces 218 may enable user interaction with the user device 106. For example, the interfaces 218 can include a voice interface to receive voice instructions and output verbal information, prompts for information, and other requested information. The interfaces 218 can also include other systems required for input devices such as keyboard inputs or other such input mechanisms for inputting information into the user device 106.

Turning now to the details of the service provider 108, the service provider 108 may include one or more service provider computers, perhaps arranged in a cluster of servers or as a server farm, and may host web service applications. The function of the service provider 108 may be implemented a cloud-based environment such that individual components of the service provider 108 are virtual resources in a distributed environment. The service provider 108 also may be implemented as part of an electronic marketplace (not shown).

The service provider 108 may include at least one memory 220 and one or more processing units (or processor(s)) 222. The processor 222 may be implemented as appropriate in hardware, computer-executable instructions, software, firmware, or combinations thereof. Computer-executable instruction, software, or firmware implementations of the processor 222 may include computer-executable or machine-executable instructions written in any suitable programming language to perform the various functions described. The memory 220 may include more than one memory and may be distributed throughout the service provider 108. The memory 220 may store program instructions that are loadable and executable on the processor(s) 222, as well as data generated during the execution of these programs. Depending on the configuration and type of memory including the service provider 108, the memory 220 may be volatile (such as RAM and/or non-volatile (such as read-only memory ("ROM"), flash memory, or other memory). The memory 220 may include an operating system 224 and one or more application programs, modules, or services for implementing the features disclosed herein including at least the voice shopping engine 104a and a natural language processing engine 238a.

The service provider 108 may also include additional storage 228, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 228, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the service provider 108 and/or part of the user device 106.

The service provider 108 may also include input/output (I/O) device(s) and/or ports 230, such as for enabling connection with a keyboard, a mouse, a pen, a voice input device, a touch input device, a display, speakers, a printer, or other I/O device.

In some examples, the service provider 108 may also include one or more user interface(s) 232. The user interface 232 may be utilized by an operator, curator, or other authorized user to access portions of the service provider 108. In some examples, the user interface 232 may include a graphical user interface, voice interfaces, web-based applications, programmatic interfaces such as APIs, or other user interface configurations. The service provider 108 may also include the data storage 236. In some examples, the data storage 236 may include one or more databases, data structures, or the like for storing and/or retaining information associated with the service provider 108. Thus, the data storage 236 may include data structures, such as a user information database 234, the product catalog 128, and the taxonomy nodes 130.

The user information database 234 may be used to retain information pertaining to users of the service provider 108 such as the user 110. Such information may include, for example, user preferences, user account information (e.g., electronic profiles for individual users), demographic information for users, payment instrument information for users (e.g., credit card, debit cards, bank account information, and other similar payment processing instruments), account preferences for users, purchase history of users, wish-lists of users, search histories for users, and other similar information pertaining to a particular user, and sets of users, of the service provider 108.

The product catalog 128 may include an expansive collection of listings of products available from an online retailer available for access, such as to purchase, rent, or otherwise interact with. The product catalog 128 may be searchable by the user device 106 using any suitable technique including those described herein. In some examples, the organization of data from the product catalog 128 may be represented by one or more search indices. In some examples, the product catalog 128 includes a plurality of searchable fields for each content product stored in the product catalog 128. Such fields may be specific to the type of product, with at least some fields being generic across types. For example, for a product type such as article of clothing, such data fields may include size, color, material, configuration, intended use, and other such information. In some examples, the values in the metadata fields may be represented by numerical codes. For example, the color may be represented by a number associated with a particular shade of a color.

The taxonomy nodes 130 may include a structured graph or arrangement of each department within the product catalog broken down according to a plurality of taxonomy nodes associated with filters of the department.. For example, the taxonomy nodes 130 may include identifications of nodes that break a department into colors, sizes, shapes, brands, prices, and other such product attributes or filters useful for dividing up the collection of items within the department.

During use, the user 110 provides a first input to the user device 106. The user device 106 may process the first input or may convey the voice command to the service provider 108 for processing using a natural language processing algorithm, such as embodied in the NLP engine 238a. In some examples, the user device 106 may include the natural language processing engine 238b. The natural language processing algorithm may be implemented through the web service application 212 or may, in some examples be part of the voice shopping engine 104. The first input may be processed to return products corresponding to a search request, as extracted from the first input, and a representation of the products may be shown on a display of the user device 106. During continued use, the user 110 provides a second input to the user device 106. The second input is processed by the NLP engine 238 in a manner similar to the first input. The voice shopping engine 104 receives the output of the NLP engine 238. The voice shopping engine 104 determines, a structured graph for the product catalog and filters associated with the structured graph. The voice shopping engine 104 also determines whether the subsequent input starts a new search or performs a refinement of a previous search. Attributes of the product searched by the user are not identified with respect to tags or filters of the product database, but are identified as attributes, with such attributes used to append the search request and thereby refine the search request of the user 110. The attributes may correspond to filters or nodes of the structured graph and may represent values that resolve each of the nodes of the structured graph.

In some examples, the user 110 provides an input to the user device 106. The user device 106 may process the input is analyzed by the NLP engine 238a and/or the voice shopping engine 104. The output of the analysis may be identification of attribute mentions within the input, identification of attribute types for matching to nodes of a structural graph, or other similar outputs. In some examples, a few examples of attributes, which may be identified as first-class attributes (e.g., brand, price, review rating, and the like) may be used to classify attributes beyond merely identifying attributes from the input. For example, given an input "show me red X-brand t-shirts with full sleeves," general attributes such as "red" and "full sleeves" may be extracted while "X-brand" is recognized as a reference to a brand, one of the first-class attributes. At a next step of the methods herein, each attribute extracted from the first input may be resolved with a potential filtering or refinement value associated with the product catalog 128. The product catalog 128 may not be classified with, or include any and all possible attribute types and values, it may be the case that some attribute mentions may not resolved (e.g., in some examples, the product catalog 128 may not include an attribute classified associated with "full sleeves" that may be unresolved). In a subsequent step of the process, the search results may be updated, e.g., refined or filtered, to reflect the request of the user 110 based on the input. In some examples the search query may be updated in a structural way (e.g., by applying an explicit filter such that results must satisfy the resolved attribute constraint). For any unresolved attributes, the process may include modifying the active search query by adding the unresolved terms (e.g., adding the attribute terms "full sleeves"). Operations described with respect to the user device 106 may be carried out on the device or on a computing system of the service provider 108, for example in a cloud computing arrangement.

Figure 3:
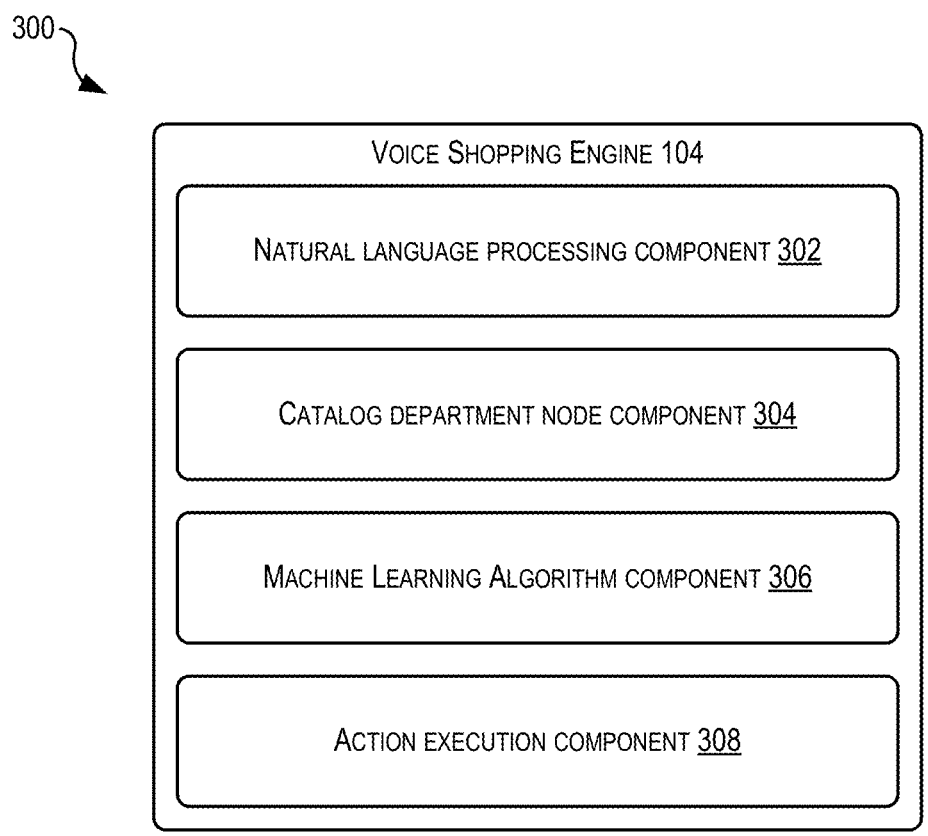
FIG. 3 is an example device including a voice shopping engine and a plurality of components, according to at least one example.

FIG. 3 illustrates an example device including a voice shopping engine 104 and a plurality of components, according to at least one example. The voice shopping engine 104 may be configured to manage one or more sub-modules, components, engines, and/or services directed to examples disclosed herein. The voice shopping engine 104 may include a number of additional elements used for searching and shopping in an online marketplace that are not shown in addition to the elements shown and used for carrying out the processes described herein. For example, the voice shopping engine 104 includes a natural language processing component 302, a catalog department node component 304, a machine learning algorithm component 306, and an action execution component 308. In some examples, the natural language processing component 302 may be separate from the voice shopping engine 104, as illustrated in FIG. 2. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other modules, components, engines, and/or services may perform the same tasks as the voice shopping engine 104 or other tasks. Each module, component, or engine may be implemented in software, firmware, hardware, and in any other suitable manner.

Generally, the natural language processing component 302 is configured to provide a voice interface to enable communication between a user such as the user 110 and a device such as the user device 106. For example, this can include enabling conversations between the user 110 and the user device 106, receiving instructions from the user 110, providing search results to the user 110, and any other suitable communication approach. The natural language processing component 302 may process the voice command from the user 110 to identify a user request within the voice command. The natural language processing component 302 implements known natural language processing algorithms to receive spoken instructions from the user 110 and output user requests for action by the user device 106.

Generally, the catalog department node component 304 is configured to access a list of potential departments for searching the product catalog. The current department of a present search of the catalog may be included as a potential department. The list of potential departments is arranged as a structured graph that may include more than one root, with nodes defining locations where the structured graph diverges into different sub-groups or sub-departments of the product catalog, for example, with a node describing a color attribute and separate roots of the structured graph for each of a plurality of color values available within the product catalog.

In some examples, some filters or nodes may be applicable across all departments, such as items related to a shipping type, shipping speed, price, product rating, brand, or other such filters. Such filters or nodes may be separate from attributes that may be specific to a particular department, or not universally applied across the entire product catalog. The catalog department node component collects known filters and attribute values for each node and branch of the structured graph for the department. Filters or attribute values that cause the roots of the structured graph to diverge may be used to uniquely identify sub-departments of the product catalog. In such examples, the structured graph is marked with a highest node for a particular attribute value. In this way, when a particular attribute value is matched by the voice shopping engine, the structured graph may be reduced to only sub-departments that fit under the umbrella including the particular attribute value. In some examples, the catalog department node component 304 may be enabled to recommend different departments other than a current department if a filter or refinement is not available in the current department. Such suggestions may also accompany a request to confirm whether a new search is intended by the user.

The process performed by the catalog department node component 304 may include several different stages or sub-processes. For example, the catalog department node component 304 may collect or access a structured graph or departments (e.g., potential departments) associated with a search query. In a subsequent step, the process may include collecting or accessing a listing or set of refinements or filters available within the potential departments. In a subsequent step, the catalog department node component 304 may traverse the structured graph from the root to identify the refinement identified in the voice input to identify a department used for searching.

The identification of the node at which the refinement from the attribute is identified may be performed via lemmatization with a string comparison of the refinements available versus the input from the voice input. In some examples, the identification may be performed by the machine learning algorithm component 306 by scoring an attribute type (key) with an attribute value. When the attribute type and the attribute value are of the same type, for example when it identifies that the attribute value is of the type associated with the attribute type, then the match is made. If multiple matches are made, then a highest score within a set of potential options is selected. In some examples, the attributes may also be searched based on synonyms or similar terms, such as may be available from the product catalog or a resource such as a thesaurus or output of a machine learning algorithm.

Generally, the machine learning algorithm component 306 receives inputs from the natural language processing component 302 describing the user request and natural language inputs from voice data from the user and may, in some examples receive inputs of contextual data from the contextual data component 304 describing the conditions and context surrounding the voice request or other syntactic or semantic clues that may be used to identify attributes mentioned in the voice request. The machine learning algorithm component 306 may include a Bidirectional Encoder Representations from Transformers (BERT), or other such algorithm capable of processing natural language strings, such as search terms, and identifying a predicted intended output in the case of an ambiguous input from the user 110. The machine learning algorithm component 306 may be trained using data of user voice requests and identifications of attributes from those search requests. The machine learning algorithm component 306 outputs a score indicative of a probability that the voice request includes an attribute. In some examples, the machine learning algorithm component 306 outputs a score for each term of the voice request indicative of the probability that the term is an attribute of a product searched by the user 110.

Generally, the action execution component 308 is configured to execute an action with a search request and identifying a department or node of the structured graph to limit the search request within. For example, the action execution component 308 may cause the search results displayed on the user device 106 to be filtered or refined in accordance with the voice request, or may initiate a new search request.

The action execution component 308 may compile all resolutions or attributes gathered from previous search turns and gather a set of refinement filters for a set of nodes on the structured graph, as accessed by the catalog department node component 304. Once a group or sub-department is identified according to the terms of the voice input processed by the natural language processing component 302, the new filters are combined with previously applied filters and search terms to generate a new search string with new filters. The new string and filters is a combination of the terms identified as search terms with the unique filters applied as identified above. In some instances, values may replace existing values within the search terms, in some examples the terms may be accumulated rather than replaced. For instance, a first color may be selected for searching with a subsequent request to show a second color. In some examples, the first color may be replaced by the second color in the final search results. In some examples, the first color and the second color may both be maintained in the search request.

Figure 4:
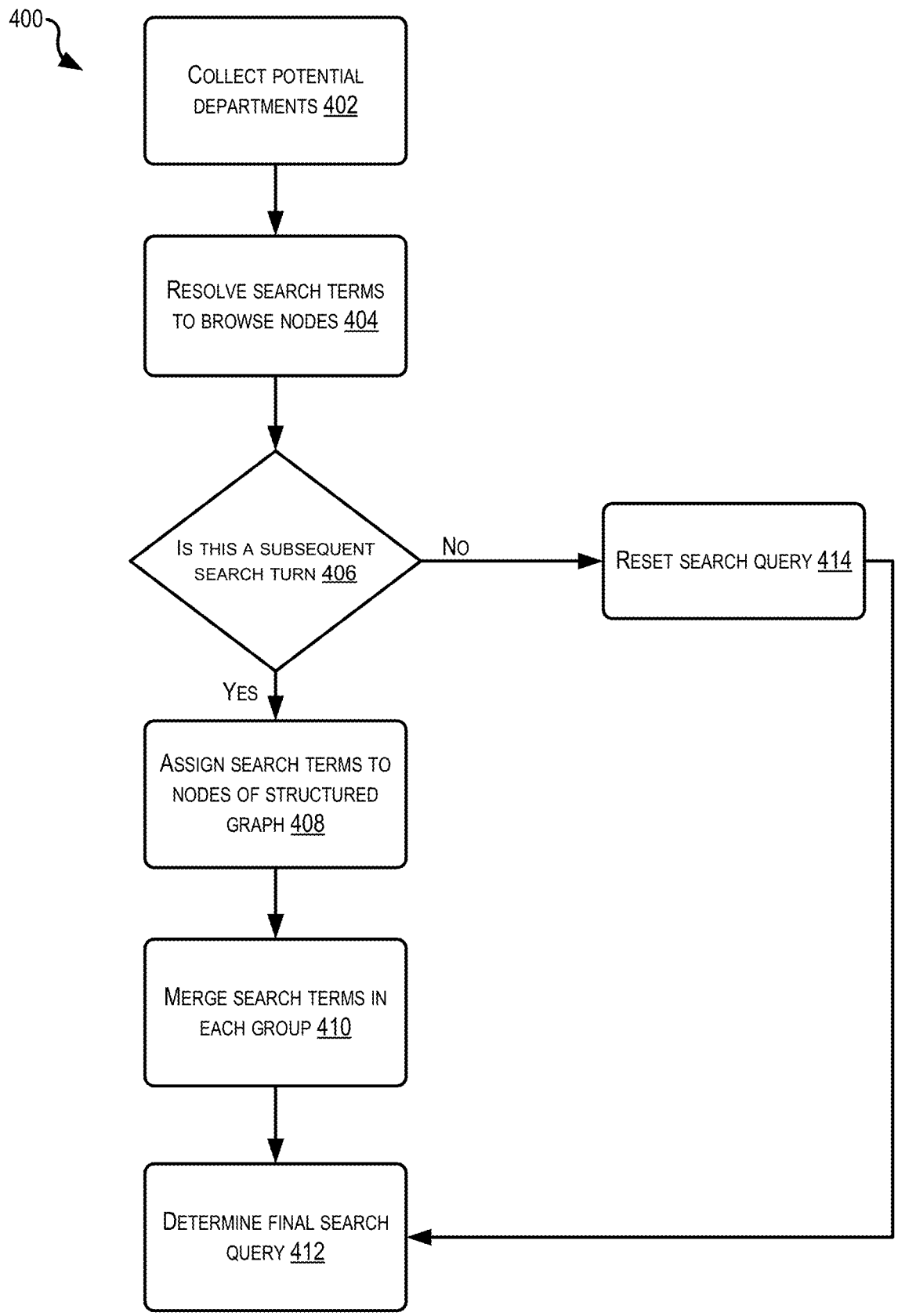
FIG. 4 is a flow diagram of a process depicting example acts for implementing techniques relating to searching a product catalog based on voice inputs, according to at least one example.

FIG. 4 is a flow diagram of a process 400 depicting example acts for implementing techniques relating to searching a product catalog based on voice inputs, according to at least one example. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 400 includes steps for resolving search terms from voice inputs to identify potential items to present for user selection while also performing a check for a new search request in place of a search refinement. The process 400 begins at 402 by collecting potential departments of a product catalog in response to a search request and the refinements associated with each department. The potential departments may be identified by identifying departments that may include one or more products of the first search request, as described above. In some examples, the potential departments may be identified by starting with an existing department from a current search turn. The departments may be structured into a structured graph having a tree-like structure. As part of the process 400, step 402 may include collecting refinements for each department as the potential departments are collected. The refinements may include attribute classes such as attribute types or classes of refinements. The refinements may also include attribute values that describe the different values included in each attribute class. The tree-like structure may include nodes, such as taxonomy nodes 130 identifying branches and sub-departments of the department. A highest department node on the structured graph may be selected initially, such that all results that may relate to the search string are contained within the department. At 404, the search terms of an input may be resolved to taxonomy nodes to identify the department to search.

At 406, the process 400 includes a check for whether the voice input from a user includes a subsequent search turn or is a refinement of the previous search turn. This process may be performed through several different examples, for instance by identifying repeated utterances indicative of a previous refinement versus new search request resolving an incorrect answer. In some examples, the systems herein may generate confidence values, using a machine learning algorithm, for each option (e.g., refinement versus new search) and may identify based on the confidence scores, for example by selecting the option with a higher confidence score. The system may, in some examples, identify when the voice input includes product attributes of a product searched in a previous search turn. When the product searched for in a previous turn has nodes on the structured graph corresponding to the attribute identified in the voice request, the system may identify that the voice input is for a refinement of the previous search. In some examples, the system may prioritize refinements and only resort to a new search if an attribute cannot be resolved within a current department of the product catalog or if the user repeats the voice input, indicating an incorrect decision on the previous refinement evaluation.

At 414, if the search turn is determined to be a new search, then the process 400 returns proceeds to 412 with the final search query and presents the search results accordingly. The new search may then be filtered according to process 400 by introducing additional search filters and providing voice prompts to refine the search results as described herein.

At 408, when the voice input is determined to be a refinement or continuation of a previous search turn, the system assigns the search terms to nodes of the structured graph described above. Each term may be identified by a type of attribute, for example with colors associated with a color node of the structured graph, and individual branches emerging from the node associated with particular color options or color values.

At 410, the search terms are merged with currently applied search terms. The new search terms may include values that replace or accumulate with previous search terms, as described above. The search terms are merged with the various filters and resolutions to generate an updated search string or search conditions that are used to search the product catalog.

At 412, the process 400 includes determining a final search query and a set or department to query. The query set includes the search terms, string, and filters from 410 and includes the department in which the search terms will be applied. The potential departments gathered above may be prioritized according to a set of preferences that may be adjusted based on user preferences or system-wide preferences. For example, a priority may be given to remain within a current search department, with a second priority to move down the structured graph to a node further down the roots of the structured graph. In some examples multiple departments, such as multiple sub-departments may be prioritized next, for example by selecting multiple color sub-departments in response to accumulating multiple color inputs from a user that would otherwise be exclusive of one another. The lowest priority may be assigned to suggesting a switch to a new department entirely, which results in losing some or all previously applied attributes and starting at a much higher node on the structured graph.

In an illustrative example, a user may provide a first search term to search for "gloves" in a catalog of an online marketplace. The first search term may be provided via a voice input, keyboard input, or other input device. The system may provide a listing of search results matching the request for "gloves." The user may then provide a voice input to "show me black leather ones." The system may identify the search terms "black" and "leather" from the voice input. The voice input does not specify the item is gloves, but the system is capable of identifying this as a refinement as described above. The structured graphs that the system may output at 402 includes four potential structured graphs including: (1) "clothing", with a sub-category of "apparel" having nested sub-categories of "gloves" and a first sub-category of "Men's" and a second sub-category of "Women's:" (2) "Work tools", with a sub-category of "wearable" having a sub-category of "gloves" and a further sub-category of "Lab, Safety, and Work Gloves;" (3) "Medical Supplies" with a sub-category of "Occupational Health & Safety Products;" and (4) "Sports" with a sub-category of "Bicycle" having a sub-category of "equipment" with a further refinement of "gloves." As part of the collection of potential departments, the potential refinements collected for each department may include refinements for "black" in each of "Clothing>Apparel>Gloves," "Medical Supplies>Occupational Health & Safety Products," and "Sports>Bicycle>Equipment>Gloves." The fourth structured graph for "Work Tools" may not include the potential refinement "black" and therefore the refinement is not added to that graph. Additionally, the "leather" refinement may be added in "Clothing>Apparel>Gloves" which may be the only graph including "leather" as a potential attribute value. The search terms are thereby assigned to nodes of the structured graphs as described at 408. Finally, at 412, the final search query is identified as within the department "Clothing" and the sub-categories described above, with refinements for "black" and "leather" as the "Clothing" department is the only department where the search terms all merge. The search results may therefore be provided from the department and using the refinements for the user to select or further refine in subsequent voice refinement turns.

Figure 5:
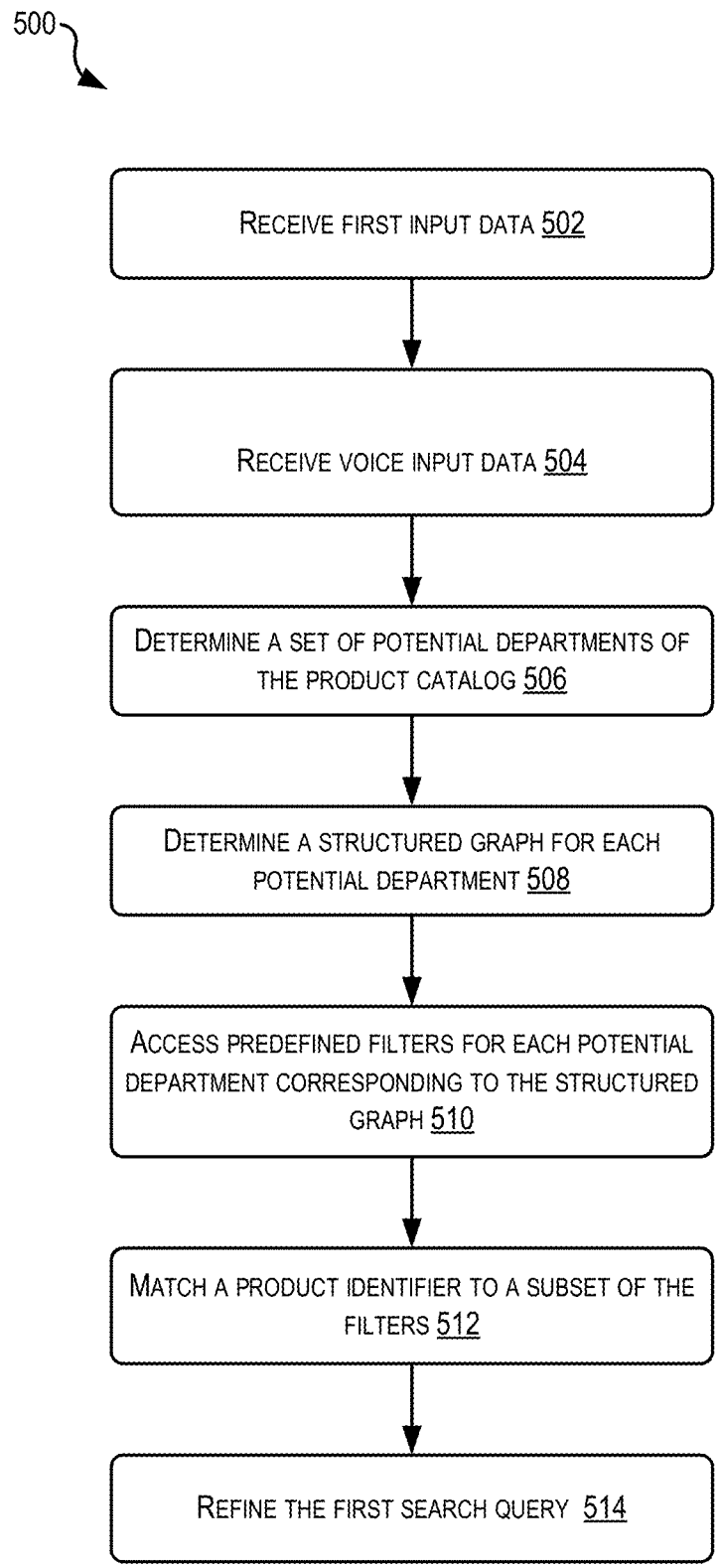
FIG. 5 is a flow diagram of a process depicting example acts for implementing techniques relating to searching a product catalog based on voice inputs, according to at least one example.

FIG. 5 is a flow diagram of a process 500 depicting example acts for implementing techniques relating to searching a product catalog based on voice inputs, according to at least one example. The process 500, and the process 400 may be implemented on a user device, as described herein, including the service provider 108, the user device 106, or any other suitable computing device, such as a cloud computing system or the computing system of FIG. 6 below.

The process 500 begins at 502 by receiving, at the service provider 108, first input data. The first input data term may include a string or multiple terms that make up a first search term or string. The first search term may be input through a voice input device of a user device 106, typed in through a user interface of a user device 106, or otherwise input with an input device and communicated to service provider 108 over network 126.

The process 500 includes, at 504, the service provider 108 receiving voice input data via a voice interface as described above. The process 500 includes the service provider 108 receiving a second search term associated with a second query. The second search term may include a string or multiple terms. The second search term is received as a voice request. In particular, the second search term may be input through an interaction by a user 110 with a voice assistant or through a voice-controlled device, such as a voice-controlled user device.

The process 500 includes determining, at 506 and by the service provider 108, a set of potential departments of the product catalog. The set of potential departments may be generated based on departments returned including one or more search results associated with the first input data. The potential departments may include a current department of the product catalog searched by the user.

The process 500 also includes the service provider 108 determining a structured graph for each potential department at 508. The structured graph may be accessed from a database of structured graphs describing the items within the product catalog and broken down by taxonomy into non-overlapping categories differentiated by various filters and attributes applied at nodes of the structured graph.

At 510, the process 500 includes the service provider 108 accessing predefined filters for each potential department corresponding to the structured graph. Each set of predefined filters may be available from the taxonomy node database 130 and may be pre-defined based on contents of the product catalog. In some examples, the predefined filters may be generated by a machine learning algorithm that classifies or categorizes large numbers of products in a catalog into different groupings arranged on the structured graph.

At 512, the process 500 includes the service provider 108 matching a product identifier to a subset of the filters. The voice input may be processed by a natural language processing algorithm and subsequently identified with a particular attribute type or other indicator that corresponds to a node of the structured graph. The node of the structured graph may define the items of the product catalog having the attribute or feature included in the voice request.

At 514, the process 500 includes the service provider 108 refining the first search query. The search performed at 612 may be performed by the service provider searching the product catalog based on the updated search terms on the selected department based on the structured graph and the matching of the attributes to a node of the structured graph, as described above. The refined search results may be provided as a refinement or filtering of previous search results or may be performed as a new search with updated parameters to provide filtered results over a previous search. The search results may be provided to the user device 106 for viewing by the user.

Figure 6:
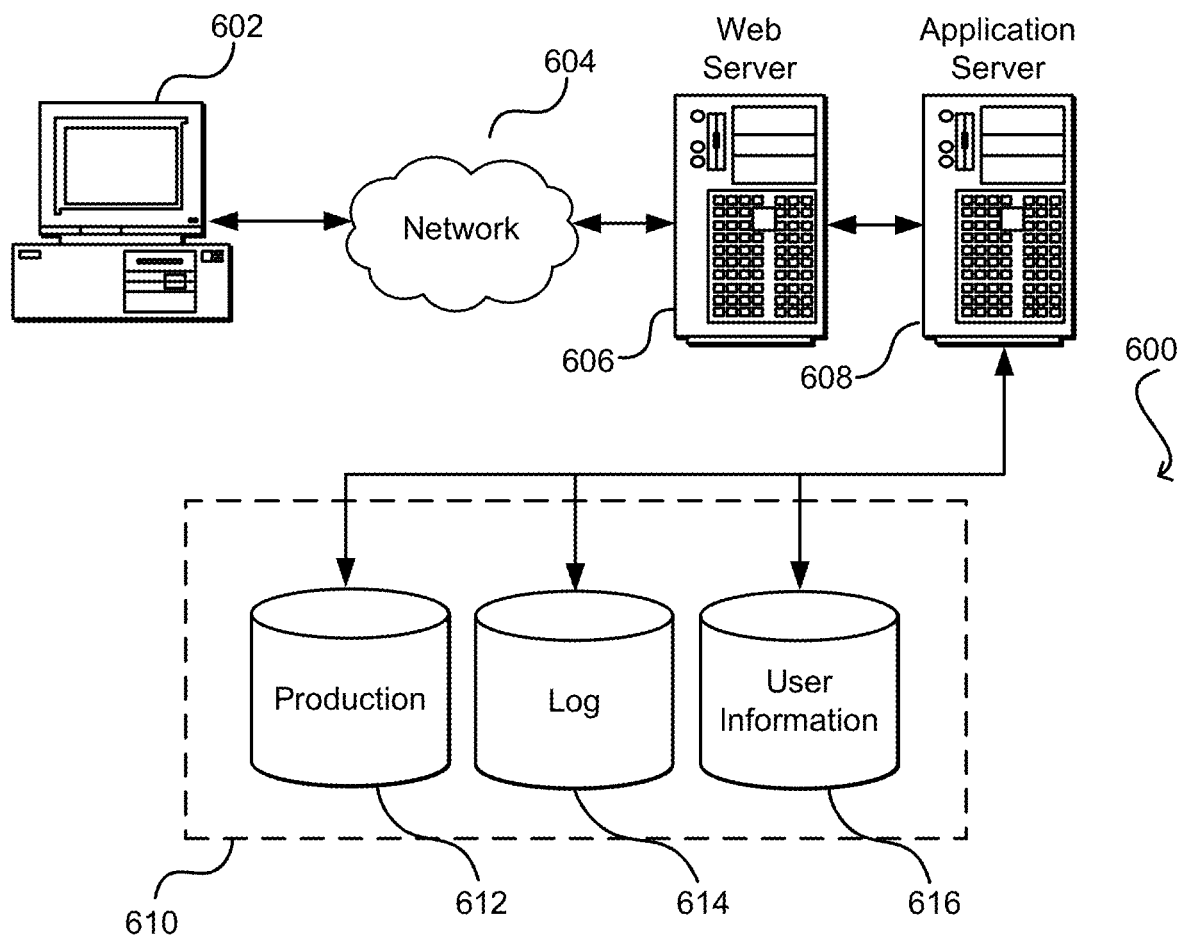
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a networked application server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the networked application server in the form of HyperText Markup Language ("HTML"), Extensible Markup Language ("XML"), or another appropriate structured language in this example. The handling of all requests and responses, as well as the delivery of content between the client device 602 and the application server 608, can be handled by the networked application server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a networked application server, the networked application server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
a memory configured to store computer-executable instructions; and
a processor configured to access the memory and execute the computer-executable instructions to at least:
receive first input data associated with a first search query comprising search terms to search a product catalog of a resource provider;
determine a set of potential departments of the product catalog to search based on the first search query;
receive voice input data and process the voice input data using a natural language processing algorithm to produce second input data, the second input data comprising an attribute class and an attribute value;
determine, based on the attribute value, a structured graph corresponding to each of the potential departments, the structured graph comprising subsets of products within each potential department divided into trees based on item attributes and filters;
access, based on the structured graph, a predefined set of filters for each of the potential departments, each of the predefined set of filters comprising the filters corresponding to the products within each of the potential departments;
determine, based on the attribute value, a subset of the predefined set of filters;
match the attribute value to one of the predefined set of filters;
determine a set of refined filters in response to matching the attribute value to one of the predefined set of filters; and
produce second search results based on the refined filters and a current department selection of the potential departments.

2. The system of claim 1, wherein the computer-executable instructions to cause the processor to additionally:
determine, based on the set of refined filters, that the voice input data comprises a refinement of the first input data, and wherein producing the second search results comprises refining the first search results based on the voice input data.

3. The system of claim 1, wherein the instructions to determine that the voice input data comprises a refinement comprise further instructions that cause the one or more processors to:
generate a refinement confidence value that the voice input data identifies a refinement;
generate a new search confidence value that the voice input data identifies a new search query; and
determine that the voice input data comprises a refinement in response to the refinement confidence value exceeding the new search confidence value.

4. The system of claim 1, wherein the instructions comprise further instructions that, when executed, cause the one or more processors to switch from a current department to a sub-department of the current department based at least in part on the structured graph and the attribute value.

5. A computer-implemented method, comprising:
receiving first input data associated with a first search query comprising search terms to search an item catalog of a resource provider;
determining a set of potential departments of the item catalog to search based on the first search query;
receiving voice input data and processing the voice input data using a natural language processing algorithm to produce second input data, the second input data comprising an attribute;
determining, based on the attribute, a structured graph corresponding to each of the potential departments, the structured graph comprising subsets of items within each potential department divided into trees based on item attributes and filters;
accessing, based on the structured graph, a predefined set of filters for each of the potential departments;
matching the attribute to a subset of the predefined set of filters; and
refining the first search query based on the subset of the predefined set of filters.

6. The computer-implemented method of claim 5, further comprising:
determining, based on the subset of the predefined set of filters, that the voice input data comprises a refinement of the first input data; and
producing second search results by refining the first search results based on the voice input data.

7. The computer-implemented method of claim 5, further comprising:
- generating a refinement confidence value that the voice input data identifies a refinement;
- generating a new search confidence value that the voice input data identifies a new search query; and
- determining that the voice input data comprises a refinement in response to the refinement confidence value exceeding the new search confidence value.

8. The computer-implemented method of claim 5, wherein refining the first search query comprises prioritizing remaining in a current department of the item catalog when refining based on the subset of the predefined set of filters and moving to a sub-department based on the structured graph if the subset of the predefined set of filters matches the filters of the sub-department.

9. The computer-implemented method of claim 5, wherein refining the first search query comprises changing to a new department based on the predefined set of filters matching attributes of the new department, based on a structured graph of the new department.

10. The computer-implemented method of claim 5, wherein refining the first search query comprises producing second search results limited to the subset of the predefined set of filters.

11. The computer-implemented method of claim 5, wherein the set of potential departments is determined based on the attribute and comprises a current search department associated with first search results produced in response to the first search query.

12. The computer-implemented method of claim 5, wherein each structured graph comprises one or more nodes associated with the predefined set of filters.

13. The computer-implemented method of claim 12, wherein the one or more nodes identify item attribute types, with sub-departments at each node separated by individual categories of the item attribute types.

14. A non-transitory computer-readable medium having instructions thereon that, when executed by one or more processors, cause the one or more processors to at least:
- receive first input data associated with a first search query comprising search terms to search an item catalog of a resource provider;
- determine a set of potential departments of the item catalog to search based on the first search query;
- receive voice input data and process the voice input data using a natural language processing algorithm to produce second input data, the second input data comprising an attribute;
- determine, based on the attribute, a structured graph corresponding to each of the potential departments, the structured graph comprising subsets of items within each potential department divided into trees based on item attributes and filters;
- access, based on the structured graph, a predefined set of filters for each of the potential departments;
- match the attribute to a subset of the predefined set of filters; and
- refine the first search query based on the subset of the predefined set of filters.

15. The non-transitory computer-readable medium of claim 14, wherein each structured graph comprises one or more nodes associated with the predefined set of filters.

16. The non-transitory computer-readable medium of claim 15, wherein the one or more nodes identify item attribute types, with sub-departments at each node separated by individual categories of the item attribute types.

17. The non-transitory computer-readable medium of claim 14, wherein the instructions comprise further instructions that, when executed by the one or more processors, cause the one or more processors to additionally:
- generate a refinement confidence value that the voice input data identifies a refinement;
- generate a new search confidence value that the voice input data identifies a new search query; and
- determine that the voice input data comprises a refinement in response to the refinement confidence value exceeding the new search confidence value.

18. The non-transitory computer-readable medium of claim 14, wherein the instructions comprise further instructions that, when executed by the one or more processors, cause the one or more processors to additionally:
- determine, based on the subset of the predefined set of filters, that the voice input data comprises a refinement of the first input data; and
- produce second search results by refining the first search results based on the voice input data.

19. The non-transitory computer-readable medium of claim 14, wherein the set of potential departments is determined based on the attribute and comprises a current search department associated with first search results produced in response to the first search query.

20. The non-transitory computer-readable medium of claim 14, wherein refining the first search query comprises producing second search results limited to the subset of the predefined set of filters.

* * * * *